United States Patent
Heinrich

(10) Patent No.: US 10,954,978 B2
(45) Date of Patent: Mar. 23, 2021

(54) FIXED OR SLIDING SCREW

(71) Applicant: EJOT BAUBEFESTIGUNGEN GMBH, Bad Laasphe (DE)

(72) Inventor: Kostja Heinrich, Bad Berleburg (DE)

(73) Assignee: EJOT BAUBEFESTIGUNGEN GMBH, Bad Laasphe (DE)

( * ) Notice: Subject to any disclaimer, the term of this patent is extended or adjusted under 35 U.S.C. 154(b) by 284 days.

(21) Appl. No.: 15/780,330

(22) PCT Filed: Dec. 1, 2016

(86) PCT No.: PCT/EP2016/079375
§ 371 (c)(1),
(2) Date: May 31, 2018

(87) PCT Pub. No.: WO2017/093374
PCT Pub. Date: Jun. 8, 2017

(65) Prior Publication Data
US 2018/0347605 A1  Dec. 6, 2018

(30) Foreign Application Priority Data

Dec. 4, 2015 (DE) .................. 10 2015 224 367.2

(51) Int. Cl.
*F16B 5/02* (2006.01)
*F16B 31/02* (2006.01)

(52) U.S. Cl.
CPC .......... *F16B 5/0258* (2013.01); *F16B 31/028* (2013.01)

(58) Field of Classification Search
CPC ...... F16B 31/028; F16B 5/0258; F16B 43/02; F16B 25/0021
(Continued)

(56) References Cited

U.S. PATENT DOCUMENTS 3,021,747 A * 2/1962 Garrett .................. E21D 21/02
411/11
3,216,303 A 11/1965 Melzer
(Continued)

FOREIGN PATENT DOCUMENTS

DE 1925415 U 10/1965
DE 1934799 A1 1/1970
(Continued)

OTHER PUBLICATIONS

International Search Report and Written Opinion Form PCT/ISA/210 and PCT/ISA/237, International Application No. PCT/EP2016/079375, pp. 1-7, International Filing Date Dec. 1, 2016, dated Mar. 3, 2017.

*Primary Examiner* — Flemming Saether
(74) *Attorney, Agent, or Firm* — Bond Schoeneck & King, PLLC; George R. McGuire

(57) ABSTRACT

The invention relates to a fixed or sliding screw with a screw head and a screw shaft which has a threaded section. The screw head has a torque transmitting section for rotating the fixed or sliding screw about a screw axis which is concentric to the screw head and the screw shaft. The screw head has a collar section at the screw head end facing the threaded section. A buffer element made of an elastic plastic is arranged on the collar section side facing away from the torque transmitting section, and a sliding disk is arranged on the buffer element side facing away from the collar section.

16 Claims, 5 Drawing Sheets

(58) Field of Classification Search
USPC .............................. 411/11, 14, 544, 531, 537
See application file for complete search history.

(56) References Cited

U.S. PATENT DOCUMENTS

| | | | | |
|---|---|---|---|---|
| 4,322,193 | A * | 3/1982 | Stahl | E21D 21/02 |
| | | | | 29/407.02 |
| 5,919,020 | A * | 7/1999 | Walther | F16B 5/0275 |
| | | | | 411/368 |
| 6,318,939 | B1 * | 11/2001 | Avaux | E01B 9/10 |
| | | | | 411/153 |
| 6,729,819 | B2 * | 5/2004 | Wallace | F16B 31/028 |
| | | | | 411/11 |
| 9,574,597 | B2 * | 2/2017 | Matteson | F16B 31/028 |
| 2009/0311066 | A1 | 12/2009 | Utille | |
| 2016/0327081 | A1 * | 11/2016 | Mair | E04C 2/46 |

FOREIGN PATENT DOCUMENTS

| | | |
|---|---|---|
| DE | 1650988 A1 | 12/1970 |
| DE | 102013002631 A1 | 8/2014 |
| EP | 2159430 A1 | 3/2010 |
| GB | 2120795 A | 12/1983 |
| WO | 2008028838 A1 | 3/2008 |

* cited by examiner

FIXED OR SLIDING SCREW

CROSS-REFERENCE TO RELATED APPLICATIONS

This application is the U.S. National Stage application under 35 U.S.C. 371 of PCT Application No. PCT/EP2016/079375, filed Dec. 1, 2016, which relates and claims priority to German Application No. DE 102015224367.2, filed Dec. 4, 2015, the entire disclosure of each of which is incorporated herein by reference.

BACKGROUND OF THE INVENTION

The invention relates to a fixed point or sliding point screw with a screw head and with a screw shank that includes a threaded portion, the screw head having a torque transmitting section for rotating the fixed point or sliding point screw about a screw axis that is disposed concentric to the screw head and the screw shank, the screw head also having a collar portion at the screw head end that faces the threaded portion.

Such fixed point or sliding point screws are known from the prior art. They are used in buildings for the screw attachment of curtain-type, rear-ventilated facades, for example. With such facades, it is known to screw a prepunched sheet metal profile, known as a wall bracket, which is prepunched with a sliding point configured as an oblong hole, for example, to another sheet metal profile that is not prepunched, known as a supporting profile. The fixed point or sliding point screws known from the prior art are inserted through the prepunched oblong hole in the wall bracket and screwed to the supporting profile. The sliding points give the screw connection a limited degree of mobility transversely to the screw axis to accommodate thermally induced changes in length, for example. For screwing, known fixed point or sliding point screws have a drill point and a self-tapping thread on the screw shank, making prepunching of the supporting profile unnecessary.

With the screw attachment of wall bracket to supporting profile, the varied sheet thicknesses of the wall bracket and the supporting profile are screwed together, with a thread-free portion below the screw head preventing excessive tightening of the connection and thus excessive compression of the components to be joined, so that a sliding of the connection is possible. Each combination of components therefore requires a screw that is matched to the precise thickness of the wall bracket and the supporting profile.

Providing such a large number of different screws is extremely costly. It is therefore known from the prior art to use two different fixed point or sliding point screws, for example, to cover a range of material combinations of different thicknesses, so that, for example, one fixed point or sliding point screw can be used for screw connections in component combinations having an overall thickness of between 3.1 and 5.0 mm, and a second fixed point or sliding point screw can be used for screw connections in component combinations having an overall thickness of between 5.0 and 7.0 mm. Known fixed point or sliding point screws used for this purpose have a thread-free portion on the screw shank in the area of the screw head, rather than having threading over the entire screw shank.

One problem with using these fixed point or sliding point screws is that the screws may be confused by an installer, since their difference in length is barely detectable visually. Moreover, for screw connections in which the overall thickness is at the minimum limit for the overall thickness allowed for the fixed point or sliding point screw, a rattling of the connection may occur.

Furthermore, for screw connections in which the overall thickness is at the maximum limit for the overall thickness allowed for the fixed point or sliding point screw, constrictive forces may occur, which prevent the screw connection from moving transversely to the screw axis due to thermally induced length changes, resulting in a jamming of the screw connection. Such jamming may occur, for example, when the overall thickness of the screw limit corresponds precisely to the overall thickness allowed for the fixed point or sliding point screw. In that case, due to manufacturing tolerances, even a slight deviation in the length of the thread-free portion can lead to jamming.

From WO2008/028838 A1 a prior art sliding point screw is disclosed which solves the problem of adaptability of the sliding point screw to different sheet thicknesses by using a conical sealing disk with an elastomer, with the screw head likewise having a corresponding conical portion. The elastomer is located on the side of the sliding point screw that faces the component to be screwed, where the elastomer is exposed to increased stress and thus also to increased corrosion. In addition, the elastomer makes it harder for the screw connection to slide due to the high coefficient of friction.

It is therefore the object of the invention to provide a fixed point or sliding point screw that avoids the disadvantages described above and is at the same time easy and inexpensive to produce.

SUMMARY OF THE INVENTION

This object is achieved with a fixed point or sliding point screw characterized in that a buffer element made of an elastic plastic is located on the side of the collar portion that faces away from the torque transmitting section, and in that a sliding disk is located on the side of the buffer element that faces away from the collar portion. This sliding disk is preferably metallic or made of a plastic.

The collar portion, the buffer element and the sliding disk are thus arranged sequentially in the axial direction, i.e. in the direction of the screw axis.

The provision of the buffer element made of elastic plastic enables the fixed point or sliding point screw to adapt to different component combinations of a screw connection to be achieved, while at the same time, the sliding disk facilitates the sliding of the fixed point or sliding point screw or of a screw connection. Excessive tightening of the screw connection can be prevented by the buffer element. For this purpose, the screwing process must be halted, with a visual orientation of the depth, when the buffer element is compressed to about 25%.

Advantageously, the screw shank is permanently connected to the screw head. The torque transmitting section may be embodied, for example, as an external hexagon or as a recess, such as an inner torx or a hexagon socket.

A first advantageous refinement of the fixed point or sliding point screw provides that the collar portion has on its side facing away from the torque transmitting section a contact surface for the buffer element, located in a plane perpendicular to the screw axis. The screw head preferably widens radially in the region of the collar portion, i.e. perpendicular to the screw axis. Such widening enables an enlarged contact surface to be provided.

It is particularly preferable for the buffer element to have two planar surfaces, arranged parallel to one another and perpendicular to the screw axis.

It has further proven particularly advantageous for the buffer element to be embodied as a ring. In that case, the buffer element is advantageously disposed beyond the screw shank radially, i.e. perpendicular to the screw axis, or encompasses the screw shank radially. A buffer element embodied as a continuous ring facilitates the installation of the fixed point or sliding point screw. However, it is also possible to assemble the buffer element from individual sections.

The sliding disk advantageously has two planar surfaces, arranged parallel to one another and perpendicular to the screw axis.

The provision of the contact surface for the buffer element and the two planar surfaces on the buffer element ensures that one surface of the sliding disk bears against a component to be screwed, which is disposed perpendicular to the screw axis.

It has also proven particularly advantageous for the fixed point or sliding point screw to be embodied as a self-drilling screw, with the screw shank having a drill point and a self-tapping thread. The drill point is advantageously designed as relatively small in comparison with the thread diameter of the self-tapping thread on the screw shank, so that the greatest possible clamping effect can be achieved in the non-prepunched component. In addition, the self-tapping thread advantageously has a low thread pitch.

It is also particularly preferable for the screw shank to have a thread-free portion, located between the threaded portion and the screw head. Such a thread-free portion enables a screw connection to slide, i.e. enables the screw connection to move transversely to the screw axis, due to thermally induced length changes, for example.

A further advantageous embodiment of the fixed point or sliding point screw provides that the screw shank in the region of the screw head has a shank collar with a shank diameter that is greater than the thread diameter in the region of the threaded portion. This is particularly advantageous because the shank collar prevents the thread of the fixed point or sliding point screw from coming into contact with the wall of a hole in a component to be screwed in such a way that the fixed point or sliding point screw or the screw connection is released by the rotation of the fixed point or sliding point screw resulting from contact with the wall of the oblong hole.

To facilitate sliding, it is particularly advantageous for the sliding disk to have a coating of Teflon on the side that faces away from the buffer element. However, it is also conceivable for the sliding disk to be made of Teflon. Such a coating can enable sliding on a wall bracket made of aluminum, stainless steel or plastic, due to an advantageous coefficient of friction.

In a refinement of the fixed point or sliding point screw, it is provided that the sliding disk has an outer diameter and that the collar portion has a collar diameter, the outer diameter of the sliding disk and the collar diameter being designed such that the collar portion and the sliding disk overlap the buffer element radially. Advantageously, the sliding disk further has an inner diameter, and the screw shank has a shank diameter. It is particularly preferable for the inner diameter and the outer diameter of the sliding disk and the collar diameter to be designed such that any tilting of the sliding disk and/or the screw head in an oblong hole of a screw connection is prevented. Advantageously, the inner diameter of the sliding disk further corresponds to the shank diameter such that the buffer element is not pressed during screwing into a gap between the sliding disk and the screw shank and thus destroyed.

In a further advantageous refinement of the fixed point or sliding point screw it is provided that the buffer element is made of an ethylene propylene diene rubber (EPDM). Ethylene propylene diene rubber (EPDM) has proven particularly advantageous due to its high temperature and UV stability and its comparatively long service life.

It is particularly preferable for the screw head, the screw shank and the sliding disk to be made of an A2 or A4 stainless steel.

To facilitate assembly of the fixed point or sliding point screw, it is particularly advantageous for the screw head, the buffer element and the sliding disk to be connected to one another. In that case, the screw head is advantageously connected to the buffer element, which in turn is connected to the sliding disk.

It has proven particularly advantageous for the screw head, the buffer element and the sliding disk to be glued to one another or connected to one another by vulcanization of the buffer element. For producing the fixed point or sliding point screw, it has proven particularly cost-effective for only the buffer element and the sliding disk to be glued to one another or connected to one another by vulcanization of the buffer element, and for no permanent connection to be produced between screw head and buffer element.

According to a further advantageous embodiment of the fixed point or sliding point screw, a visual or mechanical tightening check is provided, which is designed for verifying the tightening torque and/or the screw-in depth of the fixed point or sliding point screw. It is possible for the outer diameter of the sliding disk to be greater than the collar diameter of the collar portion, in which case the optimum tightening torque and/or the optimum screw-in depth is/are reached when the sliding disk is overlapped completely by the buffer element as viewed in the direction of the screw axis.

The aforementioned object is also achieved by a screw connection that comprises a first component and a second component and is characterized in that the first component and the second component are screwed together from the first component side using a fixed point or sliding point screw.

Advantageously, the screw shank of the fixed point or sliding point screw is inserted through a prepunched hole, in particular through an oblong hole in the first component, and is screwed to the second component by means of a drill point and a self-tapping thread.

In an advantageous refinement of the screw connection it is provided that the screw shank has a thread-free portion located between the threaded portion and the screw head, and that the length of the thread-free portion is greater than the thickness of the first component. The provision of such a selected thread-free portion ensures the mobility of the screw connection transversely to the screw axis.

It is further particularly preferable for the axial length of the shank collar to be shorter than the thickness of the first component.

Further details and advantageous refinements will be apparent from the following description, in which an embodiment of the invention is described and explained in greater detail.

BRIEF DESCRIPTION OF THE DRAWINGS

The figures show:

FIG. 3 an enlarged detail of a screw connection according to FIG. 1 with a fixed point or sliding point screw that is not completely screwed in;

DETAILED DESCRIPTION

Figure 1:
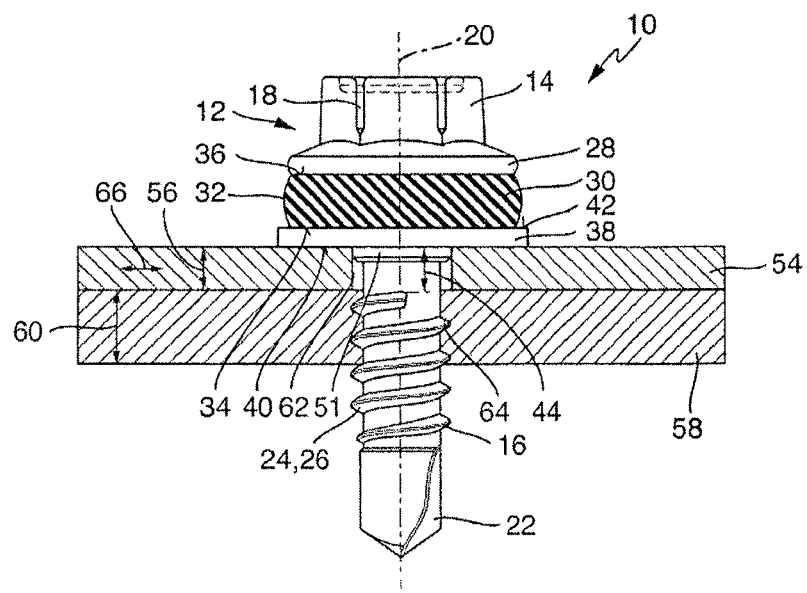
FIG. 1 a cross-section of a screw connection with a fixed point or sliding point screw according to the invention.

FIG. 1 shows a screw connection 10 with a fixed point or sliding point screw 12 according to the invention. The fixed point or sliding point screw 12 has a screw head 14 and a screw shank 16. Screw head 14 has a torque-transmitting section 18 formed as an external hexagon, by means of which the fixed point or sliding point screw 12 can be rotated about a screw axis 20, which is concentric to screw head 14 and to screw shank 16.

The fixed point or sliding point screw 12 is embodied as a drilling screw, with screw shank 16 including a drill point 22 and a threaded portion 24 with a self-tapping thread 26.

At its end that faces the threaded portion 26, screw head 14 has a collar portion 28 in which screw head 14 widens in the radial direction, i.e. perpendicular to screw axis 20. On its side that faces away from torque transmitting section 18, collar portion 28 has a contact surface 30, disposed in a plane perpendicular to screw axis 20.

In addition, a buffer element 32 made of an elastic ethylene propylene diene rubber (EPDM) is located on the side of collar portion 28 that faces away from torque transmitting section 18. Buffer element 32 has two planar surfaces 34, 36, arranged parallel to one another and perpendicular to screw axis 20. On the side of buffer element 32 that faces away from collar portion 28, a sliding disk 38 is located, which likewise has two planar surfaces 40, 42, arranged parallel to one another and perpendicular to screw axis 20. Sliding disk 38 is made of metal, preferably stainless steel, or of a plastic. Screw head 14 and screw shank 16 are made of a stainless steel, with the side 40 of sliding disk 38 that faces away from buffer element 32 having a coating of Teflon. If sliding disk 38 is made of a plastic, it is also conceivable for sliding disk 38 to be made of Teflon. Buffer element 32 is embodied as a ring and thus encompasses screw shank 16 in a radial direction. Screw shank 16 has a thread-free portion 44, located between threaded portion 24 and screw head 14.

Figure 2:
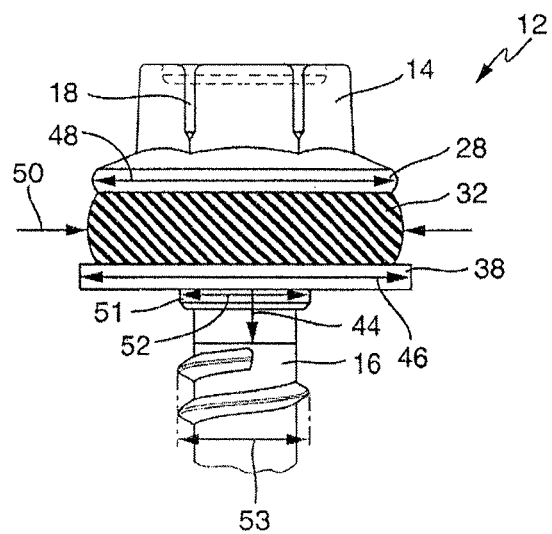
FIG. 2 an enlarged detail of a fixed point or sliding point screw according to the invention, shown alone.

As is clear from FIG. 2, sliding disk 38 has an outer diameter 46, and collar portion 28 has a collar diameter 48. Buffer element 32 has a buffer element diameter 50. Outer diameter 46, collar diameter 48 and buffer element diameter 50 are designed such that collar portion 28 and sliding disk 38 overlap buffer element 32 radially. Advantageously, outer diameter 46 is greater than collar diameter 48, thereby enabling a visual tightening check, designed for verifying the tightening torque and/or the screw-in depth of the fixed point or sliding point screw 12. The achievement of the optimum tightening torque and/or the optimum screw-in depth can be ascertained in that as buffer element 32 is compressed between sliding disk 38 and collar portion 28, the optimum tightening torque and/or the optimum screw-in depth is/are reached when sliding disk 38 is completely overlapped for the first time by buffer element 32, as viewed in the direction of screw axis 20.

Sliding disk 38 further has an inner diameter (without reference symbol), and screw shank 16 has a circular-cylindrical shank collar 51 with a shank diameter 52. Shank diameter 52 is greater than the thread diameter 53 in the region of threaded portion 24.

The inner diameter of sliding disk 38 further corresponds to the shank diameter 52 such that buffer element 32 cannot be pressed during screwing into a gap between sliding disk 38 and screw shank 16 and thus destroyed.

Screw head 14, buffer element 32 and sliding disk 38 are preferably connected to one another by gluing or vulcanization, with screw head 14 being connected to buffer element 32 and buffer element 32 in turn being connected to sliding disk 38.

Returning to FIG. 1, screw connection 10 further includes a first component 54, for example a sheet-metal profile with a thickness 56, embodied as a wall bracket. Screw connection 10 further includes a second component 58, for example a sheet-metal profile with a thickness 60, embodied as a supporting profile. Such wall brackets 54 and supporting profiles 58 are used in curtain-type, rear-ventilated facades.

Wall bracket 54 has a sliding point 62 configured as an oblong hole; the fixed point or sliding point screw 12 is inserted through the prepunched oblong hole 62 in the wall bracket 54 and is screwed to supporting profile 58. An internal thread 64 is introduced into supporting profile 58 by means of drill point 22 and self-tapping thread 26. The provision of sliding point 62 or oblong hole 62 enables a limited mobility of screw connection 10 transversely to the screw axis 20, i.e. in the direction of arrow 66, due to thermally induced changes in length, for example. In addition to oblong hole 62, wall bracket 54 also has round holes embodied as fixed points; the fixed point or sliding point screw 12 can be inserted through the oblong holes 62 and the round holes, and wall bracket 54 can also be screwed to supporting profile section 58 in this way. When screwed to a fixed point, the fixed point or sliding point screw 12 has the advantage of ensuring what is known as a "soft screw joint", preventing an over-rotation of thread 26.

The provision of buffer element 32 enables the fixed point or sliding point screw 12 of the invention to be used in screw connections 10 of different component combinations, i.e. first and second components 54, 58 of different thicknesses 56, 60, due to the elasticity or compressibility of buffer element 32; in such connections, sliding disk 38 prevents overtightening of the connection, thereby enabling, in particular, both a protection of buffer element 32 and smooth sliding on metallic components 54. Such a screw connection is also referred to as a "soft screw joint". A screw connection of components made of plastic is also possible, however.

Because shank diameter 52 is greater than thread diameter 53, thread 26 is prevented from coming into contact with the wall of oblong hole 62 in wall bracket 54 in such a way that the fixed point or sliding point screw 12 or the screw connection is released. Advantageously, the axial length of the circular cylindrical shank collar 51 is shorter than the thickness 56 of wall bracket 54.

Figure 3:
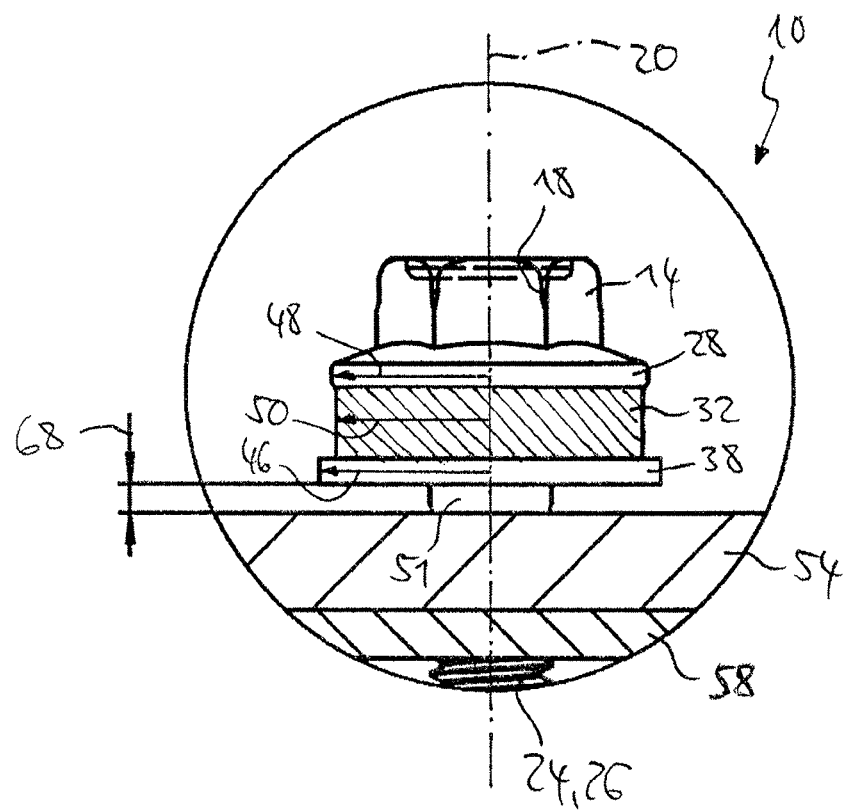
Figure 4:
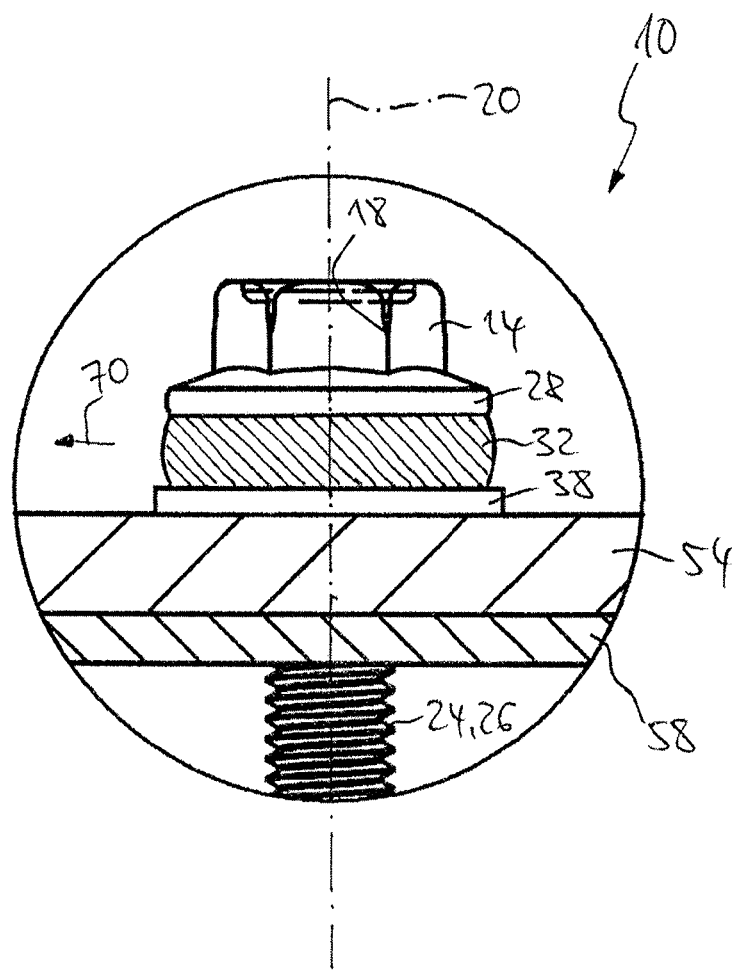
FIG. 4 the detail according to FIG. 3 with the proper screw-in depth and/or the proper tightening torque.
Figure 5:
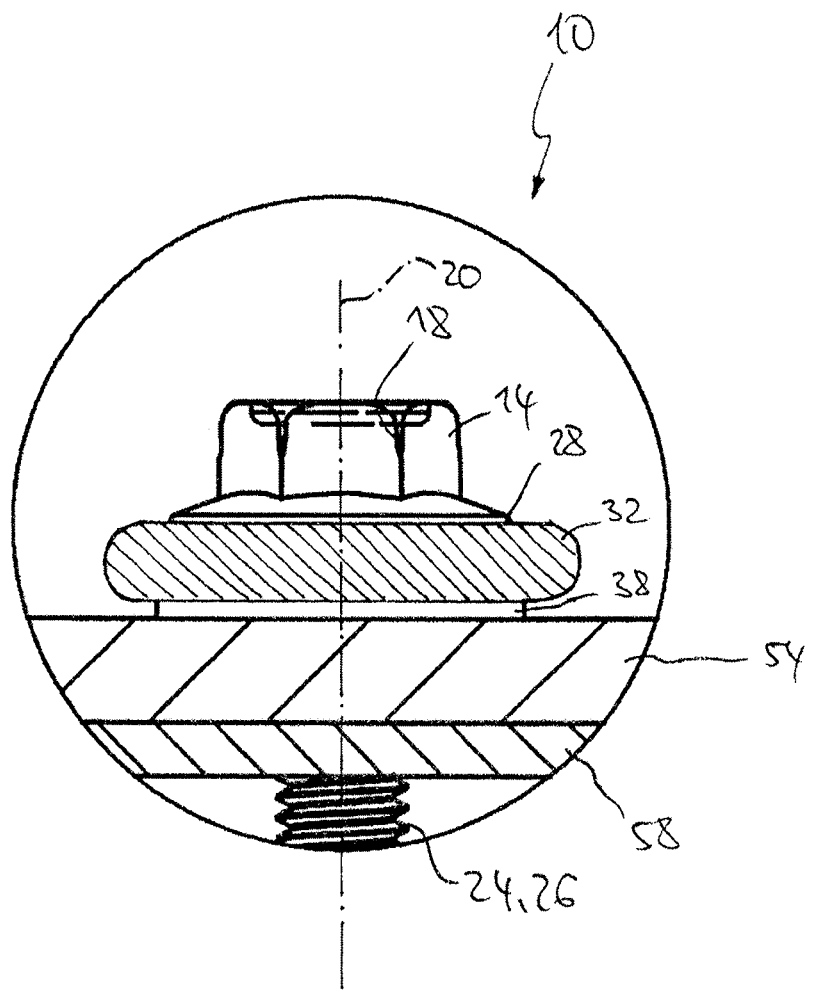
FIG. 5 the detail according to FIGS. 3 and 4 with the fixed point or sliding point screw tightened excessively.
Figure 6:
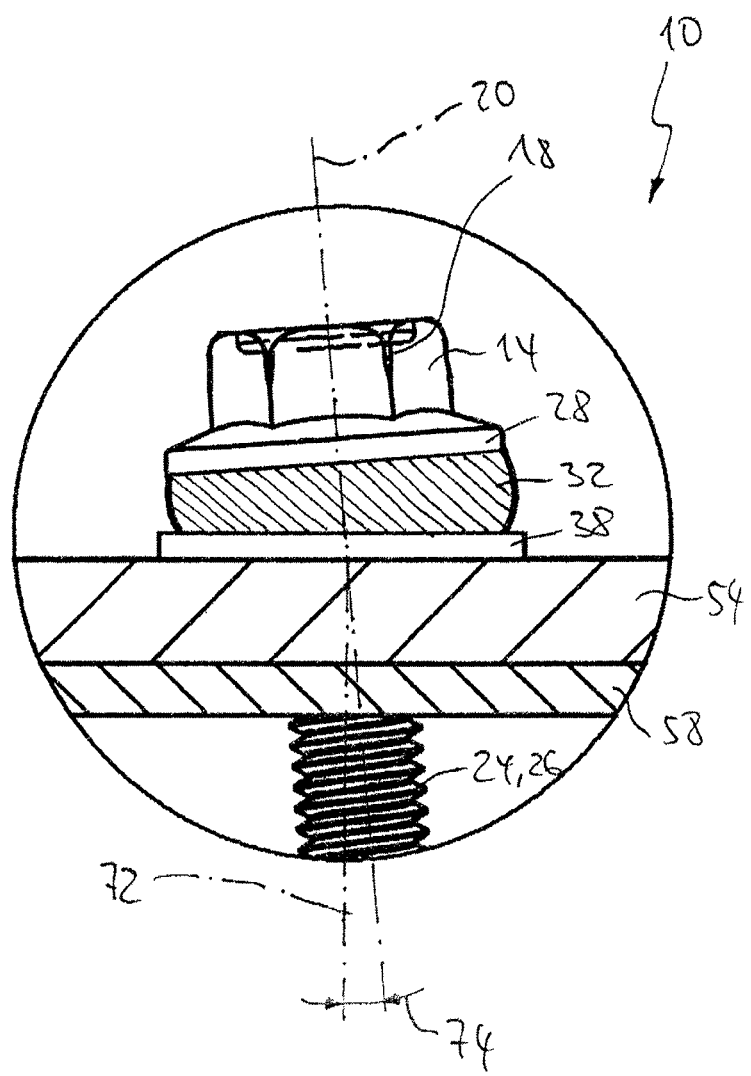
FIG. 6 the detail according to FIGS. 3 to 5 with the fixed point or sliding point screw tilted.

FIGS. 3 to 6 each show a detail of a screw connection 10 according to the invention, with FIG. 3 showing an enlarged detail of screw connection 10 according to FIG. 1 with fixed point or sliding point screw 12 only partially screwed in, and with FIG. 4 showing the detail according to FIG. 3 with the proper screw-in depth and/or the proper tightening torque, and with FIG. 5 showing the detail according to FIGS. 3 and 4 with fixed point or sliding point screw 12 overtightened, and with FIG. 6 showing the detail according to FIGS. 3 to 5 with fixed point or sliding point screw 12 tilted. Corresponding reference symbols in these figures are provided with the corresponding reference symbols of FIGS. 1 and 2.

In FIGS. 3 to 5, a visual tightening check is achieved in that the outer diameter 46 of sliding disk 38 is greater than the collar diameter 48 of collar portion 28. The achievement of an optimum tightening torque and/or an optimum screw-in depth of the fixed point or sliding point screw 12 can thus be achieved when viewed in the direction of screw axis 20.

The buffer element diameter 50 is designed to be smaller than the collar diameter 48 of collar portion 28. Then, as is clear from FIG. 3, when the fixed point or sliding point screw 12 is not screwed completely into the second component 58, buffer element 32 is not compressed between collar portion 28 and sliding disk 38, and consequently, the buffer element diameter 50 is not increased. A gap 68 therefore remains between sliding disk 38 and the first component 54.

As the thread 26 of fixed point or sliding point screw 12 is being screwed into the second component 56, buffer element 32 is pressed radially outward in the direction of arrow 70 as soon as sliding disk 38 comes to bear against the first component 54, (see FIG. 4). As is clear from FIG. 4, buffer element 32 and sliding disk 38 overlap one another as viewed in the direction of screw axis 20 such that the buffer element diameter 50 of the compressed buffer element 32 corresponds to the outer diameter 46 of sliding disk 38, and therefore, a proper screw-in depth and/or a proper tightening torque can be detected when buffer element 32 begins to overlap sliding disk 38 radially.

FIG. 5 shows screw connection 10 when the proper screw-in depth and/or the proper tightening torque has/have been exceeded. In that case, buffer element 32 is compressed so much that the buffer element diameter 50 far exceeds the outer diameter 46 of sliding disk 38. In this way, a visual tightening check can be achieved.

In FIG. 6, screw axis 20 is disposed tilted by an angle 74 in relation to an axis 72 disposed perpendicular to the first and/or second component 54, 58. This type of tilting may be caused, for example, when the fixed point or sliding point screw is not screwed in precisely coaxially in relation to the surface of the first component 54, or by the thread pitch of thread 26. The tilting can be compensated for by buffer element 32 such that the entire surface of sliding disk 38 always bears against the surface of the first component 54, and as a result, the entire surface of second component 58 bears against the surface of first component 54.

On the whole, thermally induced expansions or changes in the thickness 56, 60 of the first and second components 54, 58 can be compensated for by buffer element 32, so that screw connection 12 is always able to slide in oblong hole 62. In the event of fire, buffer element 32 can be melted, so that screw connection 12 is loosened overall, enabling a curtain-type, rear-ventilated facade to be removed particularly easily.

What is claimed is:

1. A screw having a screw head and a screw shank that includes a threaded portion, wherein the screw head has a torque transmitting section for rotating the fixed point or sliding point screw about a screw axis that is concentric to the screw head and to the screw shank, and wherein the screw head has a collar portion at the screw head end that faces the threaded portion, wherein a buffer element made of an elastic plastic is located on the side of the collar portion that faces away from the torque transmitting section, that a sliding disk is located on the side of the buffer element that faces away from the collar portion, wherein the screw shank has a shank collar in the region of the screw head, the shank collar having a smooth outer surface with a shank diameter that is greater than the thread diameter in the region of the threaded portion, and in that the shank collar protrudes over the sliding disk in the direction of the threaded portion.

2. The screw according to claim 1, characterized in that the collar portion, on the side thereof that faces away from the torque transmitting section, has a contact surface for the buffer element, said contact surface being disposed in a plane perpendicular to the screw axis.

3. The screw according to claim 1, characterized in that the buffer element has two planar surfaces arranged parallel to one another and perpendicular to the screw axis.

4. The screw according to claim 1, characterized in that the buffer element is embodied as a ring.

5. The screw according to claim 1, characterized in that the sliding disk has two planar surfaces, arranged parallel to one another and perpendicular to the screw axis.

6. The screw according to claim 1, characterized in that the fixed point or sliding point screw is embodied as a drilling screw, wherein the screw shank has a drill point and a self-tapping thread.

7. The screw according to claim 1, characterized in that the screw shank has a thread-free portion, located between the threaded portion and the screw head.

8. The screw according to claim 1, characterized in that the side of the sliding disk that faces away from the buffer element has a coating of Teflon.

9. The screw according claim 1, characterized in that the sliding disk has an outer diameter and in that the collar portion has a collar diameter, wherein the outer diameter of the sliding disk and the collar diameter are designed such that the collar portion and the sliding disk overlap the buffer element radially.

10. The screw according to claim 1, characterized in that the buffer element is made of an ethylene propylene diene rubber (EPDM).

11. The screw according to claim 1, characterized in that the screw head, the screw shank and the sliding disk are made of an A4 stainless steel.

12. The screw according to claim 1, characterized in that the screw head, the buffer element and the sliding disk are connected to one another.

13. The screw according to claim 1, characterized in that the screw head, the buffer element and the sliding disk are glued to one another or are connected to one another by vulcanization of the buffer element, or in that the buffer element and the sliding disk are glued to one another or are connected to one another by vulcanization of the buffer element.

14. The screw according to claim 1, characterized in that a visual or mechanical tightening check is provided, and is designed for verifying the tightening torque and/or the screw-in depth of the fixed point or sliding point screw.

15. A screw connection comprising a first and a second component, characterized in that the first component and the second component are screwed together from the first component side using a fixed point or sliding point screw having a screw head and a screw shank that includes a threaded portion, wherein the screw head has a torque transmitting section for rotating the fixed point or sliding point screw about a screw axis that is concentric to the screw head and to the screw shank, and wherein the screw head has a collar portion at the screw head end that faces the threaded portion, wherein a buffer element made of an elastic plastic is located on the side of the collar portion that faces away from the torque transmitting section, that a sliding disk is located on the side of the buffer element that faces away from the collar portion, wherein the screw shank has a shank collar in the region of the screw head, the shank collar having a smooth outer surface with a shank diameter that is greater than the thread diameter in the region of the threaded portion, and in that the shank collar protrudes over the sliding disk in the direction of the threaded portion.

16. The screw connection according to claim 15, characterized in that the screw shank has a thread-free portion, located between the threaded portion and the screw head, and in that the length of the thread-free portion is greater than the thickness of the first component.

\* \* \* \* \*